Jan. 25, 1966 J. E. ANTES ETAL 3,231,843

GROUNDING CONNECTOR

Filed Aug. 3, 1961 2 Sheets-Sheet 1

*INVENTORS*
JACK E. ANTES
ROCCO J. NOSCHESE

*BY* [signature]

ATTORNEY

Jan. 25, 1966 J. E. ANTES ETAL 3,231,843

GROUNDING CONNECTOR

Filed Aug. 3, 1961 2 Sheets-Sheet 2

INVENTORS
JACK E. ANTES
ROCCO J. NOSCHESE

BY

ATTORNEY

United States Patent Office
3,231,843
Patented Jan. 25, 1966

3,231,843
GROUNDING CONNECTOR

Jack E. Antes, Old Greenwich, and Rocco J. Noschese, Rowayton, Conn., assignors to Burndy Corporation, a corporation of New York Filed Aug. 3, 1961, Ser. No. 129,045
2 Claims. (Cl. 339—14)

Our invention relates to electrical connectors and particularly to a connector wherein multiple grounding connections can be easily accomplished.

The miniaturizing techniques employed in modern electronic equipment frequently involve the assembly of a large number of components into a stick, block or module element having a high density of electronic components that can be readily inserted into a panel. These electronic components may be potted or otherwise assembled into the three dimensional configuration of the stick. In order to connect the components contained in the stick into a functional electronic circuit, leads or conductors extend from one face of the stick, to which the cooperative circuit elements must be joined. Since the raison d'etre of the stick is its high density packaging of the components, the extended leads from the stick are closely adjacent to one another. In use, many of the components contained in the stick are intended to have one lead at the same electrical potential, such as ground potential.

Since the leads are closely spaced and each individual stick may have different leads which must be connected to ground potential, a unique set of grounding problems are presented thereby. The connector must be capable of connecting the leads from the stick to the remainder of the circuitry and must also be capable of grounding any selected plurality of the leads. The grounding bus associated with the several sticks must not have a high voltage drop. The grounding system must be capable of carrying the requisite voltage and current. The advantages of the individually replaceable stick make individually separable grounding connections preferable.

The customary method of grounding is effected on the bottom or wiring side of the electrical connector receptacle or panel. This involves expensive wire or bus terminations which are difficult to make. They produce a voltage drop problem through the wire and termination. Additional connectors or soldering must be added to complete the terminations. Finally, after the ground connections are made, further wiring or socket removal, etc. is difficult to effect due to space limitations.

Accordingly, the object of our invention is to provide a more effective grounding connector for an electrical receptacle or panel that is less expensive than the present type, that can be easily connected, that will not interfere with any additional wiring or connection changes that may be required, that will provide a short linear distance between ground points for a low voltage drop, and to which selective grounding can be easily accomplished.

These and other objects of our invention are accomplished and new results obtained as will be apparent from the device described in the following specification, particularly pointed out in the claims, and illustrated in the accompanying drawing in which:

Figure 1:
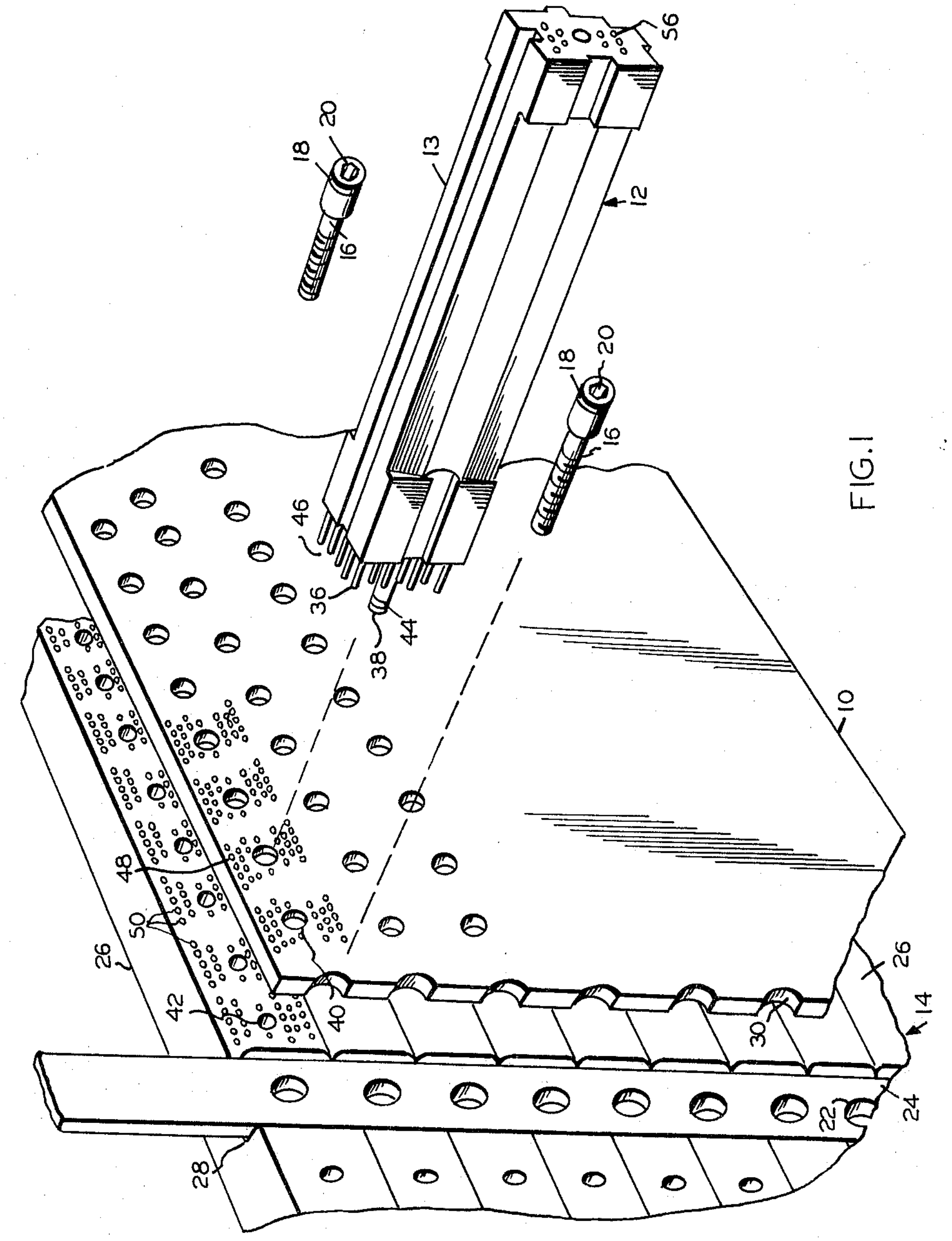
FIG. 1 is a perspective view, shown in exploded form of a modular panel, a stick element, and our grounding connector.

As is shown in the drawing, our unique grounding connector comprises a metal plate 10 interposed between the stick element 12 and the modular connector panel 14.

The grounding plate 10 may be assembled to the modular panel 14 by means of machine screws 16, each provided with a head 18 which preferably contains a recessed socket 20 for receiving a turning wrench, not shown.

The screws are inserted through holes 22 contained in a frame 24 to lock receptacle connector sections 26 to the frame 24. These collectively form the modular connector panel 14.

The receptacle sections 26 are provided with grooves 28 which are engaged by the frame elements 24.

The grounding plate 10 is provided with semi-cylindrical slots 30 which fit about the stem of the mounting screw 16, enabling the head 18 to engage the surface of the plate 10, thereby securing the plate 10, the frame 24 and the sections 26 to a base, not shown, into which the screws 16 are threaded.

The stick 12 comprises a three dimensional body portion 13 which contains the electronic components to be connected to the circuit. A plurality of leads of pins 46 extend beyond the base of the body portion 13 to provide electrical access to the components.

The stick 12 is guided into proper position relative to the modular panel 26 and the grounding plate 10 by means of a guide pin 38. The guide pin 38 projects centrally beyond the leads or pins 46 and through aperture 40 in the ground plate 10. The end of the guide pin 38 enters a socket 42 in the receptacle section 26, where a detent, not shown, may be provided for engaging a peripheral groove 44 in the guide pin 38 to retain the stick 12 in position. When properly aligned by means of the guide pin 38, each pin 46 extends through an aperture 48 in the plate 10 to enter a bore 50 in the receptacle section 26.

The pins 46 of the stick 12 which are not to be grounded extend through the apertures 48 of the ground plate 10 without contacting the same, into the bores 50 of the receptacle section 26 to engage socket contacts 51. These contacts 51 may be snap-locked into the bores 50 by means of springs 52 and shoulders 53 which engage bore constriction **50*a***.

Figure 2:
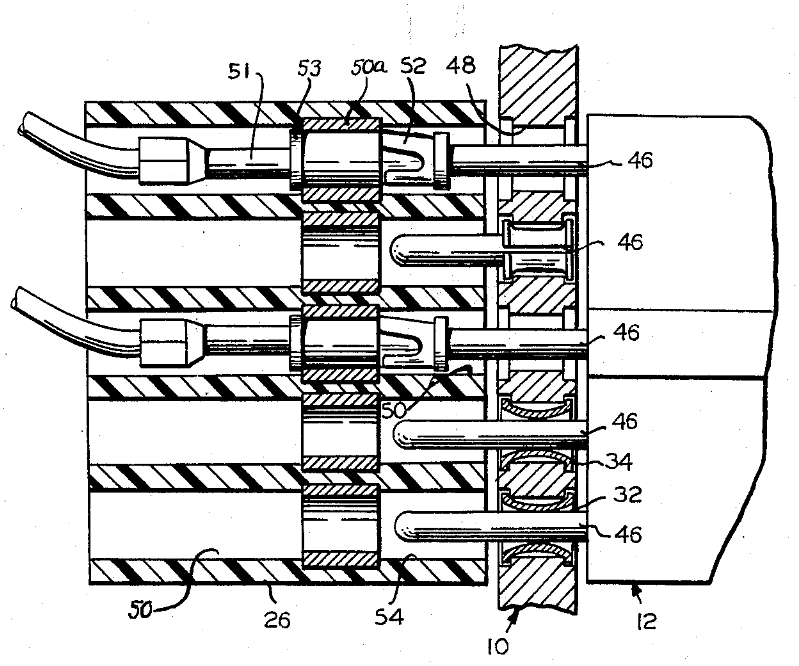
FIG. 2 is a sectional view showing the elements in assembled form.
Figure 3:
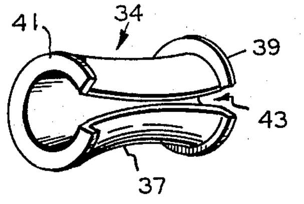
FIG. 3 is a perspective view of a grounding spring.

When it is desired to ground a selected pin 46, a spring element 34 is utilized. A preferred form of spring element 34 is shown in FIG. 3 to comprise a tubular body 37 made of resilient spring metal, bowed inwardly at its center and flanged at its ends 39 and 41. An open slit 43, running the length of the spring 34, is provided so that the spring may be collapsed to a smaller diameter and inserted into a selected aperture 48. The spring's resilient characteristic returns it to its larger normal diameter, causing the flanges 39 and 41 to mechanically grip and electrically contact the faces of plate 10, which may be counterbored as shown in FIG. 2. In order to electrically couple selected pins 46 to plate 10, springs 34 are disposed in each aperture 48 associated with a selected pin 46. As the stick 12 is inserted into the panel 14, the leads 46 to be grounded are brought into resilient electrical contact with the bowed portion of springs 34 and thus are brought into electrical contact with grounding plate 10.

The pins and socket connections are not described in detail, since their construction forms no part of the present invention. The ground plate 10 may be made of a highly conductive metal, such as copper. The body of the stick 12 and the panel 14, between which the ground plate is interposed, should be made of insulating material such as plastic or have insulating means provided. Obviously, the configuration of the spring 34 may be altered if desired.

The panel remote end of the stick 12 may have various socket apertures 56 provided therein for completing other electrical connections, depending on the function of the stick 12, or for use in testing the circuit formed by stick 12.

The connector receptacle grounding plate provides a novel method for grounding multiple connections. It provides minimum linear separation between ground points, thereby reducing the chance of ground loops due to potential differences in a multiple chassis ground, as well as providing a low voltage drop. By placing the grounding plate on the face of the receptacle, a relatively inexpensive ground is provided, which also frees the rear of the receptacle for additional wiring, makes it easy to remove the sticks without disturbing the ground connection pattern.

We have thus described our invention, but we desire it understood that it is not confined to the particular forms or uses shown and described, the same being merely illustrative, and that the invention may be carried out in other ways without departing from the spirit of our invention and, therefore, we claim broadly the right to employ all equivalent instrumentalities coming within the scope of the appended claims, and by means of which objects of our invention are attained and new results accomplished, as it is obvious that the particular embodiments herein shown and described are only some of the many that can be employed to attain these objects and accomplish these results.

We claim:

1. A separable electrical connector having a pin portion with a plurality of pin contacts of given diameter projecting therefrom and a receptacle portion for receiving said pin contacts, in combination with a ground plate interposed between said pin portion and said receptacle portion for selectively interconnecting said contacts at a common electrical potential, and means for securing said ground plate to said connector; said ground plate comprising: an integral sheet of conductive material having a plurality of apertures of diameter greater than said given diameter extending therethrough and positioned to pass said plurality of pin contacts without making contact therewith; and at least two resilient conductive elements electrically coupled to said plate and releasably mounted at least two of said apertures; each conductive element having a portion adapted to electrically and mechanically engage a pin contact extending through the corresponding aperture.

2. The combination in accordance with claim 1 wherein each conductive element is a resilient tubular metal spring coaxially disposed in said aperture and in electrical contact with said plate, said tubular spring having an inner diameter at least equal to or smaller than that of the pin to be passed into said aperture, said spring being adapted to receive the pin therethrough.

References Cited by the Examiner

UNITED STATES PATENTS

| | | | |
|---|---|---|---|
| 840,537 | 1/1907 | Weir | 339—18 |
| 2,442,984 | 6/1948 | Paris | 339—18 |
| 2,936,406 | 5/1960 | DuVal et al. | |
| 2,939,100 | 5/1960 | Watts | 339—18 |
| 2,967,285 | 1/1961 | Freitas | 339—18 |
| 3,045,077 | 7/1962 | Knanishu | 339—18 X |
| 3,128,138 | 4/1964 | Noschese | 339—18 X |

FOREIGN PATENTS

| | | |
|---|---|---|
| 239,345 | 9/1925 | Great Britain. |

JOSEPH D. SEERS, *Primary Examiner.*